US007536638B2

(12) United States Patent
Barrus et al.

(10) Patent No.: US 7,536,638 B2
(45) Date of Patent: May 19, 2009

(54) ACTION STICKERS FOR IDENTIFYING AND PROCESSING STORED DOCUMENTS

(75) Inventors: John W. Barrus, Menlo Park, CA (US); Stephen R. Savitzky, San Jose, CA (US); Kurt Wesley Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 387 days.

(21) Appl. No.: 10/665,097

(22) Filed: Sep. 16, 2003

(65) Prior Publication Data
US 2006/0262995 A1 Nov. 23, 2006

(51) Int. Cl.
*G06F 15/00* (2006.01)
(52) U.S. Cl. ............... 715/233; 715/277; 715/262
(58) Field of Classification Search ............... 715/500
See application file for complete search history.

(56) References Cited

U.S. PATENT DOCUMENTS

| | | | |
|---|---|---|---|
| 4,417,239 A | 11/1983 | Demke et al. | |
| 4,823,303 A | 4/1989 | Terasawa | |
| 4,907,973 A | 3/1990 | Hon et al. | |
| 4,987,447 A * | 1/1991 | Ojha | 399/84 |
| 4,998,215 A | 3/1991 | Black et al. | |
| 5,060,135 A * | 10/1991 | Levine et al. | 715/769 |
| 5,142,579 A | 8/1992 | Anderson | |
| 5,153,831 A | 10/1992 | Yianitos | |
| 5,161,037 A * | 11/1992 | Saito | 358/468 |
| 5,168,371 A * | 12/1992 | Takayanagi | 358/296 |
| 5,191,611 A | 3/1993 | Lang | |
| 5,225,900 A * | 7/1993 | Wright | 358/501 |
| 5,243,381 A * | 9/1993 | Hube | 399/84 |
| 5,247,575 A | 9/1993 | Sprague et al. | |
| 5,255,389 A * | 10/1993 | Wang | 707/10 |
| 5,267,303 A * | 11/1993 | Johnson et al. | 379/100.07 |
| 5,280,609 A * | 1/1994 | MacPhail | 707/1 |
| 5,299,123 A | 3/1994 | Wang et al. | |
| 5,309,359 A | 5/1994 | Katz et al. | |
| 5,349,658 A | 9/1994 | O'Rourke et al. | |
| 5,369,508 A * | 11/1994 | Lech et al. | 358/462 |

(Continued)

FOREIGN PATENT DOCUMENTS

CN  1097394 C  12/2002

(Continued)

OTHER PUBLICATIONS

Abdel-Mottableb, M. et al., "Face Detection in Complex Environments From Color Images," IEEE ICIP 622-626, 1999.

(Continued)

*Primary Examiner*—Doug Hutton
*Assistant Examiner*—Nathan Hillery
(74) *Attorney, Agent, or Firm*—Fenwick & West LLP

(57) ABSTRACT

A user affixes one or more action stickers to a collection coversheet to identify, by location on the coversheet, target documents within a previously stored collection of documents. The action stickers also specify actions to be performed on the target documents. The coversheet is scanned and the affixed stickers are located and read. The specified actions are then performed on the target documents. If the specified actions change the organization or architecture of the document collection, an updated version of the collection may be generated and stored, and a new coversheet may be printed. The action stickers may be removable, self-adhesive labels.

76 Claims, 3 Drawing Sheets

U.S. PATENT DOCUMENTS

| | | | |
|---|---|---|---|
| 5,384,703 A | 1/1995 | Withgott et al. | |
| 5,404,295 A | 4/1995 | Katz et al. | |
| 5,418,948 A | 5/1995 | Turtle | |
| 5,438,426 A | 8/1995 | Miake et al. | |
| 5,442,795 A | 8/1995 | Levine et al. | |
| 5,444,476 A | 8/1995 | Conway et al. | |
| 5,448,375 A * | 9/1995 | Cooper et al. | 358/403 |
| 5,459,307 A * | 10/1995 | Klotz, Jr. | 235/454 |
| 5,468,371 A | 11/1995 | Nelson et al. | |
| 5,479,600 A | 12/1995 | Wroblewski et al. | |
| 5,481,666 A | 1/1996 | Nguyen et al. | |
| 5,490,217 A | 2/1996 | Wang et al. | |
| 5,499,108 A * | 3/1996 | Cotte et al. | 358/400 |
| 5,548,666 A | 8/1996 | Yoneda et al. | |
| 5,581,682 A * | 12/1996 | Anderson et al. | 715/530 |
| 5,586,238 A | 12/1996 | Murata | |
| 5,596,700 A | 1/1997 | Darnell et al. | |
| 5,638,543 A | 6/1997 | Pedersen et al. | |
| 5,661,799 A | 8/1997 | Nagel et al. | |
| 5,666,414 A | 9/1997 | Micali | |
| 5,680,223 A * | 10/1997 | Cooper et al. | 358/403 |
| 5,680,636 A | 10/1997 | Levine et al. | |
| 5,682,330 A | 10/1997 | Seaman et al. | |
| 5,682,540 A * | 10/1997 | Klotz et al. | 715/505 |
| 5,686,957 A | 11/1997 | Baker | |
| 5,690,496 A | 11/1997 | Kennedy | |
| 5,694,470 A | 12/1997 | Jernbacker | |
| 5,694,559 A | 12/1997 | Hobson et al. | |
| 5,710,874 A * | 1/1998 | Bergen | 358/1.16 |
| 5,715,381 A * | 2/1998 | Hamilton | 358/1.15 |
| 5,717,879 A | 2/1998 | Moran et al. | |
| 5,721,897 A | 2/1998 | Rubinstein et al. | |
| 5,734,752 A * | 3/1998 | Knox | 358/3.28 |
| 5,734,753 A | 3/1998 | Bunce | |
| 5,737,599 A | 4/1998 | Rowe et al. | |
| 5,748,805 A | 5/1998 | Withgott et al. | |
| 5,751,283 A | 5/1998 | Smith | |
| 5,754,308 A * | 5/1998 | Lopresti et al. | 358/403 |
| 5,754,939 A * | 5/1998 | Herz et al. | 455/3.04 |
| 5,760,767 A | 6/1998 | Shore et al. | |
| 5,761,655 A | 6/1998 | Hoffman | |
| 5,761,686 A * | 6/1998 | Bloomberg | 715/529 |
| 5,764,368 A | 6/1998 | Shibaki et al. | |
| 5,765,176 A * | 6/1998 | Bloomberg | 715/514 |
| 5,774,260 A | 6/1998 | Petitto et al. | |
| 5,778,397 A | 7/1998 | Kupiec et al. | |
| 5,781,785 A | 7/1998 | Rowe et al. | |
| 5,784,616 A | 7/1998 | Horvitz | |
| 5,793,365 A | 8/1998 | Tang et al. | |
| 5,802,175 A | 9/1998 | Kara | |
| 5,802,294 A | 9/1998 | Ludwig et al. | |
| 5,812,664 A * | 9/1998 | Bernobich et al. | 380/278 |
| 5,819,301 A | 10/1998 | Rowe et al. | |
| 5,832,474 A | 11/1998 | Lopresti et al. | |
| 5,838,317 A | 11/1998 | Bolnick et al. | |
| 5,857,185 A | 1/1999 | Yamamura | |
| 5,860,074 A | 1/1999 | Rowe et al. | |
| 5,870,552 A * | 2/1999 | Dozier et al. | 709/219 |
| 5,870,770 A | 2/1999 | Wolfe | |
| 5,873,107 A | 2/1999 | Borovoy et al. | |
| 5,892,536 A | 4/1999 | Logan et al. | |
| 5,903,538 A | 5/1999 | Fujita et al. | |
| 5,903,646 A | 5/1999 | Rackman | |
| 5,933,498 A | 8/1999 | Schneck et al. | |
| 5,933,829 A | 8/1999 | Durst et al. | |
| 5,933,841 A | 8/1999 | Schumacher et al. | |
| 5,943,679 A | 8/1999 | Niles et al. | |
| 5,946,678 A | 8/1999 | Aalbersberg | |
| 5,950,187 A | 9/1999 | Tsuda | |
| 5,978,477 A | 11/1999 | Hull et al. | |
| 5,982,507 A | 11/1999 | Weiser et al. | |
| 5,986,655 A | 11/1999 | Chiu et al. | |
| 5,986,692 A | 11/1999 | Logan et al. | |
| 5,987,226 A | 11/1999 | Ishikawa et al. | |
| 5,987,454 A | 11/1999 | Hobbs | |
| 5,990,934 A | 11/1999 | Nalwa | |
| 5,999,173 A | 12/1999 | Ubillos | |
| 6,006,218 A | 12/1999 | Breese et al. | |
| 6,009,177 A | 12/1999 | Sudia | |
| 6,009,442 A | 12/1999 | Chen et al. | |
| 6,021,403 A | 2/2000 | Horvitz et al. | |
| 6,026,409 A | 2/2000 | Blumenthal | |
| 6,028,601 A | 2/2000 | Machiraju et al. | |
| 6,055,542 A | 4/2000 | Nielsen et al. | |
| 6,094,648 A | 7/2000 | Aalbersberg et al. | |
| RE36,801 E | 8/2000 | Logan et al. | |
| 6,101,503 A | 8/2000 | Cooper et al. | |
| 6,106,457 A | 8/2000 | Perkins et al. | |
| 6,182,090 B1 | 1/2001 | Peairs | |
| 6,262,724 B1 | 7/2001 | Crow et al. | |
| 6,298,145 B1 | 10/2001 | Zhang et al. | |
| 6,301,660 B1 * | 10/2001 | Benson | 713/165 |
| 6,332,147 B1 | 12/2001 | Moran et al. | |
| 6,339,825 B2 | 1/2002 | Pensak et al. | |
| 6,369,811 B1 | 4/2002 | Graham et al. | |
| 6,373,585 B1 | 4/2002 | Mastie et al. | |
| 6,408,330 B1 | 6/2002 | DeLaHuerga | |
| 6,409,401 B1 | 6/2002 | Petteruti et al. | |
| 6,466,329 B1 | 10/2002 | Mukai | |
| 6,519,360 B1 | 2/2003 | Tanaka | |
| 6,529,920 B1 | 3/2003 | Arons et al. | |
| 6,611,628 B1 | 8/2003 | Sekiguchi et al. | |
| 6,674,923 B1 | 1/2004 | Shih et al. | |
| 6,687,383 B1 | 2/2004 | Kanevsky et al. | |
| 6,724,494 B1 | 4/2004 | Danknick | |
| 6,751,732 B2 | 6/2004 | Strobel et al. | |
| 6,752,317 B2 | 6/2004 | Dymetman et al. | |
| 6,775,651 B1 | 8/2004 | Lewis et al. | |
| 6,807,303 B1 | 10/2004 | Kim et al. | |
| 6,824,044 B1 | 11/2004 | Lapstun et al. | |
| 6,892,193 B2 | 5/2005 | Bolle et al. | |
| 7,031,965 B1 | 4/2006 | Moriya et al. | |
| 7,131,058 B1 | 10/2006 | Lapstun | |
| 7,165,268 B1 | 1/2007 | Moore et al. | |
| 2001/0037408 A1 | 11/2001 | Thrift et al. | |
| 2002/0004807 A1 | 1/2002 | Graham et al. | |
| 2002/0006100 A1 | 1/2002 | Cundiff, Sr. et al. | |
| 2002/0049614 A1 | 4/2002 | Rice et al. | |
| 2002/0085759 A1 * | 7/2002 | Davies et al. | 382/203 |
| 2002/0097426 A1 | 7/2002 | Gusmano et al. | |
| 2002/0159637 A1 | 10/2002 | Echigo et al. | |
| 2002/0163653 A1 | 11/2002 | Struble et al. | |
| 2002/0171857 A1 | 11/2002 | Hisatomi et al. | |
| 2002/0199149 A1 | 12/2002 | Nagasaki et al. | |
| 2003/0051214 A1 | 3/2003 | Graham et al. | |
| 2003/0084462 A1 | 5/2003 | Kubota et al. | |
| 2003/0088582 A1 | 5/2003 | Pflug | |
| 2003/0117652 A1 | 6/2003 | Lapstun | |
| 2003/0130952 A1 | 7/2003 | Bell et al. | |
| 2003/0160898 A1 | 8/2003 | Baek et al. | |
| 2003/0163552 A1 | 8/2003 | Savitzky et al. | |
| 2003/0184598 A1 | 10/2003 | Graham | |
| 2004/0090462 A1 | 5/2004 | Graham | |
| 2004/0128613 A1 | 7/2004 | Sinisi | |
| 2004/0193571 A1 | 9/2004 | Barrus et al. | |
| 2004/0194026 A1 | 9/2004 | Barrus et al. | |
| 2004/0240541 A1 | 12/2004 | Chadwick et al. | |
| 2006/0288236 A1 | 12/2006 | McCue | |

FOREIGN PATENT DOCUMENTS

| | | |
|---|---|---|
| EP | 378 848 A2 | 7/1990 |
| EP | 459 174 A2 | 12/1991 |
| EP | 737 927 A2 | 10/1996 |

| | | |
|---|---|---|
| EP | 762 297 A2 | 3/1997 |
| EP | 802 492 A1 | 10/1997 |
| EP | 0864959 A2 | 9/1998 |
| EP | 1 001 605 A3 | 5/2000 |
| EP | 1133170 A2 | 9/2001 |
| GB | 2 137 788 A | 10/1984 |
| GB | 2 156 118 A | 10/1985 |
| GB | 2 234 609 A | 2/1991 |
| GB | 2 290 898 A | 1/1996 |
| GB | 2290878 A | 1/1996 |
| JP | 8-297677 A | 11/1996 |
| JP | 2006-261717 A | 9/2006 |
| WO | WO 99/18523 | 4/1999 |
| WO | WO 99/18523 A1 | 4/1999 |
| WO | WO 99/38099 A1 | 7/1999 |
| WO | WO 02/098670 A2 | 6/2002 |

OTHER PUBLICATIONS

Arons, B. "SpeechSkimmer: A System for Interactively Skimming Recorded Speech," ACM Transactions on Computer-Human Interaction 4(1):3-38.

Begole et al., "Supporting Worker Independence in Collaboration Transparency," ACM 0-58113-034-1/98/11, VIrginia Polytechnic Institute and State University, pp. 133-142, 1998.

Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.

Divakaran, A. et al., "Video Browsing System Based on Compressed Domain Feature Extraction," IEEE Transactions on Consumer Electronics 46:637-644.

Doermann et al., "Applying Algebraic and Differential Invariants for Logo Recognition," Machine Vision and Applications 9:73-86, 1996.

Dorai, C. et al., "Perceived Visual Motion Descriptors from MPEG-2 for content-based HDTV annotation and retrieval," IEEE $3_{rd}$ Workshop on Multimedia Signal Processing, 147-152.

Erol, B. et al., "Local Motion Descriptors," IEEE Workshop on Multimedia Signal Processing, 467-472, 2001.

Foote, J. et al., "Finding Presentations in Recorded Meeting Using Audio and Video Features." ICASPP, 3029-3032, 1999.

Foote, J. et al., "FlyCam: Practical Panoramic Video and Automatic Camera Control," Proceedings of International Conference on Multimedia & Expo, 3:1419-1422, 2000.

Glance, Natalie et al., "Knowledge Pump: Community-Centered Collaborative Filtering," Xerox Research Centre Europe, Grenoble Laboratory, Oct. 27, 1997, pp. 1-5.

Grasso, Antonietta et al., "Supporting Informal Communication Across Local and Distributed Communities," Xerox Research Centre Europe, Grenoble, France, 8 pages.

Greenberg, S., "A Fisheye Text Editor for Relaxed-WYSIWIS Groupware," ACM SIGCHI'96 Conference on Human Factors in Computing System, Companion Proceedings, 1996, 5 pages.

Gross, R. et al., "Face Recognition in a Meeting Room," IEEE International Conference on Automatic Face and Gesture Recognition, 294-299.

Gross, R. et al., "Towards a Multimodal Meeting Record," Proceedings of International Conference on Multimedia and Expo, 1593-1596.

Hsu, R.L., et al., "Face Detection in Color Images," Proc. International Conference on Image Processing, 1046-1049, 2001.

Johnson, S.E., "Who Spoke When?—Automatic Segmentation and Clustering for Determining Speaker Turns," Proc. Of Eurospeech, 679-682, 1999.

Kapralos, B. et al., "Eyes'n Ears Face Detection," 2001 International Conference on Image Processing, 1:65-69, 2001.

Kimber, D. et al., "Acoustic Segmentation for Audio Browsers," Proc. Interface Conference, Sydney, Australia, 10 pages, 1996.

Lee, D. et al., "Segmenting People in Meeting Videos Using Mixture Background and Object Models," Proc. Of Pacific Rim Conference on Multimedia, Taiwan, Dec. 16-18, 8 pages, 2002.

Li et al., "Text Extraction, Enhancement and OCR in Digital Video," DAS '98, LNCS 1655, pp. 363-377, Springer-Verlag Berlin Heidelberg 1999.

Pfau, T. et al., "Multispeaker Speech Activity Detection for the ICSI Meeting Recorder," Proc. IEEE Automatic Speech Recognition and Understanding Workshop, 4 Pages, 2001.

Pingali, G. et al., "Multimedia Retrieval Through Spatio-Temporal Activity Maps," ACM Multimedia 129-136, 2001.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Stauffer, C. et al., "Adaptive Background Mixture Models for Real-Time Tracking," Proceedings of Computer Vision and Pattern Recognition, 246-252.

Sun, X. et al., "A Motion Activity Descriptor and its Extraction in Compressed Domain," Proc. IEEE Pacific-Rim Conference on Multimedia (PCM '01), 4 Pages, 2001.

Sun, X. et al., "Panoramic Video Capturing and Compressed Domain Virtual Camera Control," ACM Multimedia, pp. 329-338, 2001.

Taghva et al., "Evaluation of an Automatic Markup System," Proceedings SPIE vol. 2422, Document Recognition II, p. 317-327, Mar. 1995.

Tritschler, A. et al., "Improved Speaker Segmentation and Segments Clustering Using the Bayesian Information Criterion," Proc. Of Eurospeech, pp. 679-682, 1999.

Waibel, A. et al., "Advances in Automatic Meeting Record Creation and Access," Proceedings of the International Conference on Acoustics, Speech, and Signal Processing, pp. 597-600, 2001.

Xerox, "Flowport, Effective Document Management," brochure, 2 pages.

Xerox, "Flowport, Paper that knows where it's going," Xerox Corporation, specification sheet, 1 page.

Xerox, "FlowPort Software, Solutions for the Legal Market from Xerox," 2001 Xerox Corporation, 2 pages.

Xerox, "FlowPort™ Xerox Image Routing Software FlowPort Overview," Xerox Corporation, 2003, 4 pages.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

ZDnet, "Captured! Three document capture systems tested," ZDnet, Technology & Business, Nov. 28, 2002, [visited on Apr. 29, 2003], <http://www.zdnet.com.au/printfriendly?AT=2000023555-20270277-4>, 8 pages.

Acrobat Reader Version 2.0 (software application), Adobe Systems Incorporated, screenshots Figures 1-10 (1994).

Adobe Acrobat Reader 3.0 screen dumps (fig. 1-3), 1996.

Adobe Premiere (video editing software) from http://www.adobe.com (2002).

Adobe Systems, Inc., "Adobe Photoshop 4.0 User Guide for Macintosh and Windows," 1996, Title Page, Copyright Page, Chap. 2, pp. 30-31.

Apple Macintosh system 7 reference manual, pp. 30-31 (1991).

Ball, Thomas et al., "Software Visualization in the Large," IEEE Computer, vol. 29, No. 4, Apr. 1996, pp. 33-43, http://www.computer.org/computer/co1996/r4033abs.htm.

Begole et al., "Flexible Collaboration Transparency," doc. ID: ncstri.vatach_cs/TR-98-11, Virginia Polytechnic Institute and State University, 1998.

Begole et al. "Flexible Collaboration Transparency: Supporting Worker Independence In Replicated Application-Sharing Systems," ACM Transactions On Computer-Human Interaction, Jun. 1999, pp. 95-132, vol. 6, No. 2.

Begole et al., "Supporting Worker Independence In Collaboration Transparency," technical report from the Computer Science Department of Virginia Tech, doc. ID: ncstrl.vatech_cs/TR-98-12.

Bobick et al., "A State Based Approach to the Representation and Recognition of Gesture," IEEE Trans. On Pattern Analysis and Machine Intelligence, pp. 1325-1337, 1997.

Boguraev et al., "Salience-Based Content Characterization Of Text Documents," ACL/EACL'97 Intelligent Scalable Text Summarization Workshop Program, Jul. 11, 1997, 14 pages.

Boreczky, J. et al., "An Interactive Comic Book Presentation for Exploring Video," Conference on Human Factors in Computing Systems (CHI 2000), ACM Press, pp. 185-192, 2000.

Boykin et al., "Improving Broadcast News Segmentation Processing," IEEE Multimedia '99, 1999.

Boykin et al., "Machine Learning Of Event Segmentation for News on Demand," Communications of the ACM, 43:35-41, 2000.

Brandow et al., "Automatic Condensation of Electronic Publications by Sentence Selection," Information Processing and Management, 31(5):875-685, 1995.

Brown et al., "Automatic Content-Based Retrieval of Broadcast News," ACM Multimedia 5, San Francisco, CA, 1995.

Byrd, D., "A Scrollbar-based visualization for Document Navigation," doc. ID:xxx.cs.IR/9902028, Computing Research Repository: Information Retrieval, 1999.

"c:\...\9149920c.wpd—unmodified" Screen Shots of document created in Corel WordPerfect, 4 pages (Apr. 30, 2002).

Chen et al., "Emotion Recognition from Audiovisual Information," Proc. IEEE Workshop on Multimedia Signal Processing, Los Angeles, CA, USA, pp. 83-88, 1998.

Chen et al., "ViBE: A Video Indexing and Browsing Environment," Proceedings of the SPIE Conference on Multimedia Storage and Archiving Systems, Sep. 20-22, 1999, Boston 3846:148-164, 1999.

Chiu et al., "NoteLook: Taking Notes in Meetings with Digital Video and Ink," ACM Multimedia 99 Orlando, 1999.

Chiu et al., "Automatically Linking Multimedia Meeting Documents by Image Matching," Proceedings of Hypertext '00, ACM, New York, pp. 244-245, 2000.

Christel et al., "Evolving Video Skims into Useful Multimedia Abstractions," Proceedings of the CHI '98 Conference on Human Factors in Computing Systems, pp. 171-178 Los Angeles, CA, Apr. 1998.

Christel et al., "Information Visualization Within a Digital Video Library," Journal of Intelligent Information Systems, 11:35-257, 1998.

Dellaert et al., "Recognizing Emotion in Speech," Proceedings ICSLP 96, Fourth International Conference on Spoken Language Processing New York, IEEE vol. 1970-1973, Cat. No. 96TH8206), 1996.

Dimitrova et al., "Video Keyframe Extraction and Filtering: A Keyframe is not a Keyframe to Everyone," CIKM 1997:113-120, 1997.

Donato et al., "Classifying Facial Actions," IEEE Trans. on Pattern Analysis and Machine Intelligence, 21:974-989, 1999.

Drucker et al., "SmartSkip: Consumer Level Browsing and Skipping of Digital Video Content,"0 Paper: Technology to Help People Find Information, vol. No. 4, Issue No. 1, pp. 219-226, Minneapolis, Minnesota, USA, Apr. 20-25, 2002.

Essa et al., "Coding Analysis Interpretation and Recognition of Facial Expressions," IEEE Trans. on Pattern Analysis and Machine Intelligence, 19:757-763, 1997.

"FaceIt Face Recoginition Technology Frequently Asked Technical Questions," Visionics Corporation, 36 pages.

"Flexible JAMM Screenshots," downloaded from internet site http://simon.cs.ct.edu/-jamm May 4, 2000.

Foote, J. et al., "An Intelligent Media Browser Using Automatic Multimodal Analysis," ACM Multimedia '98, ACM Press, pp. 375-380, Bristol, UK, 1998.

Furui et al., "Japanese Broadcast News Transaction and Information Extraction," Communications of the ACM, 43(2):71-73, Feb. 2000.

Gauvain et al., "Transcribing Broadcast News for Audio and Video Indexing," Communications of the ACM, 43:64-70, 2000.

Gibbon, David C., "Generating Hypermedia Documents from Transcriptions of Television Programs Using Parallel Text Alignment," Handbook of Internet and Multimedia Systems and Applications, CRC Press, 1998.

Gliedman, J., "Virtual Office Managers," Computer Shopper, 18(9):290, 1998.

Gordon, "Using Annotated Video as in Information Retrieval Interface," ACM Proceedings of the 5th International Conference on Intelligent User Interfaces, New Orleans, pp. 133-140, 2000.

Greenberg, Saul, "A Fisheye Text Editor For Relaxed-WYSIWIS Groupware," ACM SIGCHI'96 Conference on Human Factors in Computing System, Companion Proceedings, 1996, pp. 212-213.

Greenberg, et al., "Sharing Fisheye Views In Relaxed-WYSIWIS Groupware Applications," Proceedings of Graphics Interface, Toronto, Canada, May 22-24, 1995, Distributed by Morgan-Kaufmann, pp. 28-38, http://www.cpsu.ucalgary.ca/grouplab/papers/1996/96-Fisheye.GI/gi96fisheye.html.

Hauptmann et al., "Story Segmentation and Detection of Commercials in Broadcast News Video," Advances in Digital Libraries Conference, Santa Barbara, CA Apr. 22-23, 1998.

Hauptmann et al., "Text, Speech and Vision for Video Segmentation: the Informedia Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO., pp. 1-8, May 1995, http://www.acm.org/sigchi/chi95/Electronic/documents/papers/mah_bdy.htm.

Hecht, "Embedded Data Glyph Technology for Hardcopy Digital Documents," Proc. SPIE 2171:341-352, 1994.

Hecht, "Printed Embedded Data Graphical User Interfaces," IEEE Computer, Mar. 2001.

Hill et al., "Edit Wear and Read Wear," Computer Graphics and Interactive Media Research Group, pp. 3-9, May 1992.

Hu et al., "Multimedia Description Framework (MDF) for Content Descriptions of Audio/Video Documents," Fourth ACM Conference on Digital Libraries (DL '99), Aug. 11-14, 1999.

IBM Technical Disclosure Bulletin, "Quick Selection of Window Environment Coordinates," 35:57-60, ISS # 4B, 1992.

Ioffe et al., "Finding People by Sampling," Proc. International Conference on Computer Vision, pp. 1092-1097, 1999.

Jang et al., "Improving Acoustic Models With Captioned Multimedia Speech," IEEE, 1999, pp. 767-771.

Jin et al., "Topic Tracking for Radio, TV Broadcast, and Newswire," Proceedings of the DARPA Broadcast News Workshop, Feb. 28-Mar. 3, 1999, Hemdon, VA.

Komlodi et al., "Key Frame Preview Techniques for Video Browsing," Proceedings of the 3rd ACM International Conference on Digital Libraries, Jun. 23-26, 1998, Pittsburgh, pp. 118-125, 1998.

Lam et al., "Automatic Document Classification Based on Probabilistic Reasoning: Model and Performance Analysis," IEEE, 3:2719-2723, 1997.

Langley, P., "An Analysis of Bayesian Classifiers," Proceedings of 10th National Conference on Artificial Intelligence, pp. 223-228, 1992.

Langley, P., "Induction of Selective Bayesian Classifiers," Proceedings of 10th National Conference on Uncertainty in Artificial Intelligence, pp. 400-406, 1994.

Li et al., "Automatic Text Detection and Tracking in Digital Video," IEEE Transactions on Image Processing—Special Issue on Image and Video Processing for Digital Libraries, 9:147-156, 2000.

Li et al., "Text Extraction and Recognition in Digital Video," Proceedings of Third IAPR Workshop on Document Analysis Systems, pp. 119-128, 1998.

Li et al., "Vision: A Digital Video Library," Proceedings of the 1st ACM International Conference on Digital Libraries, pp. 19-27, 1996.

Liang et al., "Practical Video Indexing and Retrieval System," SPIE 3240:294-303, 1988.

Lienhart et al., "On the Detection and Recognition of Television Commercials," Proc. IEEE Conf. On Multimedia Computing and Systems, Ottawa, Canada, pp. 509-516, Jun. 1997.

Ma et al., "An Indexing and Browsing System for Home Video," Invited paper, EUSIPCO '2000, 10th European Signal Processing Conference, 5-8, Sep. 2000, Tampere, Finland.

Manber, U., "The Use of Customized Emphasis in Text Visualization," Proceedings of 1997 IEEE Conf. On Information Visualization, pp. 132-138, Aug. 27-29, 1997, London, England.

Maybury, "News on Demand," Communications of the ACM, 43:33-34, 2000.

Maybury et al., "Multimedia Summaries of Broadcast News," International Conference on Intelligent Information Systems, 1997, pp. 442-449.

Maybury, M. et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Navigation Using Story Segmentation," Advanced Information Systems Center, The MITRE Corporation, 1997.

Merlino et al., "Broadcast News Processing Techniques," MITRE Technical Report, MTR 99B0000031, Apr. 1999.

Mohan, "Text-Based Search of TV News Stories," Proc. SPIE 2916:2-13, 1996.

Myers, B.A. et al., "Multi-View Intelligent Editor for Digital Video Libraries," First ACM and IEEE Joint Conference on Digital Libraries, pp. 106-115, Jun. 24-28, 2001, Roanoke, VA.

Oh et al., "Efficient and Cost-Effective Techniques for Browsing and Indexing Large Video Databases," SIGMOD Conference 2000: 415-426.

Rist, T. et al., "Adding Animated Presentation Agents to the Interface," ACM International Conference on Intelligent User Interfaces, pp. 79-86, 1997.

Rowley et al., "Neural Network-Based Face Detection," IEEE Transactions on Pattern Analysis and Machine Intelligence, 20:23-38, 1998.

Schweighofer et al., "The Automatic Generation of Hypertext Links in Legal Documents," Lecture Notes in Computer Science, vol. 1134, Wagner et al., eds., from 7th Int. Conf., DEXA '96, Sep. 1996, Zurich, Switzerland.

Shahraray et al., "Automatic Generation of Pictorial Transcripts of Video Programs," Proceedings of the SPIE—Int. Soc. Opt. Eng. 2417:512-518, 1995.

Shahraray et al., "Pictorial Transcripts: Multimedia Processing Applied to Digital Library Creation," 1997 IEEE First Workshop on Multimedia Signal Processing, pp. 581-586, 1997.

Shahraray et al., "Automated Authoring of Hypermedia Documents of Video Programs," ACM Multimedia 95, San Francisco, CA, Nov. 5-9, 1995.

Smith et al., "Video Skimming and Characterization Through the Combination of Image and Language Understanding," Computer Vision and Pattern Recognition IEEE 1997.

Sodergard et al., "Integrated Multimedia Publishing—Combining TV and Newspaper Content on Personal Channels," downloaded from http:www8.org/w8-papers/1b-multimedia/integrated/integrated.html on Apr. 4, 2002, pp. 1-22.

Sonmez et al., "Multiple Speaker Tracking and Detection: Handset Normalization and Duration Scoring," Digital Signal Processing 10:133-143, 2000.

Suda et al., "Logo and Word Matching Using a General Approach to Signal Registration," Fourth International Conference on Document Analysis and Recognition, Ulm, Germany, Aug. 18-20, 1997, 61-65.

Sumita et al., "Document Structure Extraction for Interactive Document Retrieval Systems," Proceedings of SIGDOC 93, pp. 301-310, Oct. 5-8, 1993, Kitchner, Ontario.

Taghva et al., "An Evaluation Of An Automatic Markup System," SPIE Proceedings, Feb. 6-7, 1995, pp. 317-327, vol. 2422.

Taxt, T., "Segmentation of Document Images," IEEE, 11(12):1322-1329 (1989).

Tennenhouse et al., "A Software-Oriented Approach to the Design of Media Processing Environments," Proceedings of the IEEE International Conference on Multimedia Computing and Systems, pp. 435-444, 1994.

Tonomura et al., "VideoMAP and VideoSpaceIcon: Tools for Anatomizing Video Content," Proc. INTERCHI '93, ACM, pp. 131-136, 1993.

Uchihashi et al., "Summarizing Video Using a Shot Importance Measure and a Frame-Packing Algorithm," Proceedings of the International Conference on Acoustics, Speech, and Signal Processing, Phoenix, AZ, 6:3041-3044, 1999.

Uchihashi et al., "Video Manga: Generating Semantically Meaningful Video Summaries," ACM Multimedia 99, Orlando, Florida, Oct. 30-Nov. 5, 1989.

VideoLogger, Automate Video Acquisition And Production, Virage, Inc., [online] [Retrieved on Apr. 26, 2002] Retrieved from the Internet<URL:http://www.virage.com/products/details.cfm?productID=5&categoryID=1>.

"Video Mail Retrieval Using Voice" Cambridge University Engineering Department Computer Laboratory and Olivetti Research Laboratory summary of research found at http://svr-www.eng.cam.ac.uk/research/projects/vmr/ (1997).

Wactlar et al., "Complementary Video and Audio Analysis for Broadcast News Archives," Communications of the ACM, 43:42-47, 2000.

Wactlar et al., "Intelligent Access to Digital Video: Informedia Project," Computer 29:46-52, 1996.

Weiss et al., "Composition and Search with a Video Algebra," IEEE Multimedia 2:12-25, 1995.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Wittenburg et al., Browsing with Dynamic Key Frame Collages in Web-Based Entertainment Video Services, In Proceedings of IEEE International Conference on Multimedia Computing and Systems, Jun. 7-11, 1999, Florence, Italy, 2:913-918, 1999.

Zhang et al., "Detection of Text Captions in Compressed Domain Video," International Multimedia Conference Proceedings of the 2000 ACM Workshops on Multimedia 2000, Los Angeles, CA, pp. 201-204.

Damiani, E. et al. "A Fine-Grained Access Control System for XML Documents," ACM Transactions on Information and System Security, May 2002, pp. 169-202, vol. 5, No. 2.

Grasso, A. et al., "Augmenting Recommender Systems By Embedding Interfaces Into Practices," Proceedings of the 33rd Hawaii International Conference on System Sciences 2000 IEEE, pp. 1-9.

Hoadley, C., "A Very Short Introduction to UNIX," The Metropolitan State College of Denver/Information Technology Center for Technology Services, Apr. 30, 2002, pp. 1-18.

Khare, R., "Anatomy Of A URL (and Other Internet-Scale Namespaces, Part 1)," IEEE Internet Computing, Sep.-Oct. 1999, pp. 78-81.

Shen, H. et al. "Access Control For Collaborative Environments," CSCW 92 Proceedings, Nov. 1992, pp. 51-58.

Sloman, M., "Policy Driven Management For Distributed Systems," To be published in Journal of Network and Systems Management, Plenum Press, 1994, vol. 2, No. 4.

"Flowport, Paper that knows where it's going," specification sheet, 2 pages total.

<http://www.zdnet.com.au/printfriendly?AT=2000023555-20270277-4>, "Captured! Three document capture systems tested, Nov. 28, 2002," visited on Apr. 29, 2003, 9 pages total.

Lutz, Raymond, "BrowseFax Initiative," MPFA Information Site, downloaded from internet, http://www.mtpa.org/pub/browsefax_wp.htm on May 14, 2004.

Xerox FlowPort Software, Solutions for the Legal Market from Xerox, 2001 Xerox Corporation, 4 pages total.

Meyers et al., "Fascimile with Encrypted Hard Copy," IBM Technical Disclosure Bulletin, TDB 04-78, Apr. 1, 1978, pp. 4994-4995, [online] [Retrieved on Apr. 7, 2006] Retrieved from the Internet<URL:http://www.ip.com/pubview/IPCOM00069447D>.

Office Action in Chinese Application No. 200410102384.4, Nov. 10, 2006, 13 pages.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.

European Search Report, EP 04255837, Sep. 5, 2006, 3 pages.

European Search Report, EP 04255839, Sep. 4, 2006, 3 pages.

European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books with Voices: Paper Transcripts as a Tangible Interface to Oral Histories," CHI Letters, Apr. 5-10, 2003, pp. 89-96, vol. 5, Issue 1.

Lamming et al., "Using Automatically Generated Descriptions of Human Activity to Index Multi-Media Data," IEEE Multimedia Communications and Applications IEEE Colloquium, Feb. 7, 1991, pp. 5/1-5/3.

"Microsoft Powerpoint—Wikipedia, the free encyclopedia," Wikipedia Foundation, inc. [onlin] [Retrieved on Nov. 7, 2006] Retrieved from the Internet<URL:http://en.wikipedia.org/wiki/Microsoft_PowerPoint>.

Minami, K. et al., "Video Handling with Music and Speech Detection," IEEE Multimedia, Jul.-Sep. 1998, pp. 17-25.

* cited by examiner

ACTION STICKERS FOR IDENTIFYING AND PROCESSING STORED DOCUMENTS

CROSS-REFERENCE TO RELATED APPLICATIONS

This application is related to U.S. patent application Ser. No. 10/404,916 titled "Method and Apparatus for Composing Multimedia Documents," filed Mar. 31, 2003, the disclosure of which is incorporated by reference.

This application is related to U.S. patent application Ser. No. 10/404,927 titled "Multimedia Document Sharing Method and Apparatus," filed Mar. 31, 2003, the disclosure of which is incorporated by reference.

This application is related to the following commonly owned and co-pending U.S. patent applications, the disclosures of which are incorporated by reference:

U.S. patent application Ser. No. 09/521,252 titled "Method and System for Information Management to Facilitate the Exchange of Ideas During a Collaborative Effort," filed Mar. 8, 2000;

U.S. patent application Ser. No. 10/001,895 titled "Paper-Based Interface For Multimedia Information," filed Nov. 19, 2001;

U.S. patent application Ser. No. 10/081,129 titled "Multimedia Visualization & Integration Environment," filed Feb. 21, 2002;

U.S. patent application Ser. No. 10/085,569 titled "A Document Distribution and Storage System," filed Feb. 26, 2002;

U.S. patent application Ser. No. 10/174,522 titled "Television-based Visualization and Navigation Interface," filed Jun. 17, 2002;

U.S. patent application Ser. No. 10/175,540 titled "Device For Generating A Multimedia Paper Document," filed Jun. 18, 2002

U.S. patent application Ser. No. 10/307,235 titled "Multimodal Access of Meeting Recordings," filed Nov. 29, 2002; and U.S. patent application Ser. No. 10/639,282 titled "Physical Key for Accessing a Securely Stored Digital Document," filed Aug. 11, 2003.

BACKGROUND OF THE INVENTION

1. Field of the Invention

This invention relates generally to document management, and more specifically to techniques of identifying documents in a digitally stored collection and specifying actions to execute on the documents.

2. Background of the Invention

Despite the ideal of a paperless environment that the popularization of computers had promised, paper continues to dominate the office landscape. Ironically, the computer itself has been a major contributing source of paper proliferation. The computer simplifies the task of document composition, and thus has enabled even greater numbers of publishers. Oftentimes, many copies of a document must be made so that the document can be shared among colleagues, thus generating even more paper.

Despite advances in technology, practical substitutes for paper remain to be developed. Computer displays, PDAs (personal digital assistants), wireless devices, and the like all have their various advantages, but they lack the simplicity, reliability, portability, relative permanence, universality, and familiarity of paper. In many situations, paper remains the simplest and most effective way to store and distribute information.

The conveniences and advantages that paper offers signal that its complete replacement is not likely to occur soon, if ever. Perhaps then, the role of the computer is not to achieve a paperless society. Instead, the role of the computer may be as a tool to move effortlessly between paper and electronic representations and maintain connections between the paper and the electronic media with which it was created.

Related, commonly owned applications for "Method and Apparatus for Composing Multimedia Documents," and "Multimedia Document Sharing Method and Apparatus," the disclosures of which are incorporated herein by reference, describe techniques for organizing multimedia documents into one or more collections. A collection coversheet, or document index, representative of the collection can be printed on a suitable medium, such as paper. This coversheet can provide access to the collection by using a multi-function peripheral (MFP). In this way, individuals can share multimedia documents in the collection by distributing copies of the coversheet to recipients.

Most prior methods to interact with digitally stored documents require the user to enter commands by typing or pressing buttons on hardware or selecting options from displayed menus on the MFP or on a computer. These systems require the user to interact with the hardware and/or navigate menu options and other user interface features on a display device. Some existing paper-based systems require specialized coversheets to provide processing instructions. For example, a coversheet may be used at the beginning of the print job to specify the number of copies, the size of the paper, etc. These systems require a supply of these coversheets to be kept on hand, and usually require the user to take the time to customize the sheet by filling in the details of the job.

In published European Patent Application No. 99308879.8, "Document Processing," filed Nov. 8, 1999, inventors Klotz et al. disclose a technique of applying a sticker to a hardcopy document to specify a service to perform on that document. When the sticker is scanned, the requested service is identified and performed on the document. Such a system does not provide a technique for specifying actions to be performed on stored documents. Furthermore, a disadvantage of such a system is that the sticker may obscure a portion of the original document; also, since the document is scanned at the same time as the sticker is scanned, the image of the sticker is present on subsequent copies of the document. Moreover, according to the described techniques in Klotz et al, stickers only provide instructions for processing the document to which they are attached.

What is needed is a system and method for providing instructions for processing documents without requiring users to interact with a user interface or hardware device. What is further needed is a system and method that allows users to employ stickers to specify document processing actions for stored documents, including for documents other than the document to which the stickers are attached. What is further needed is a system and method that avoids the limitations of prior art schemes for providing instructions for processing stored documents.

SUMMARY OF THE INVENTION

According to the present invention, a user affixes one or more action stickers onto a collection coversheet, document index, or other identifier sheet, in order to specify actions to be performed on a stored document. The action sticker, together with other information on the identifier sheet, indicate to an MFP: a) a desired action; and b) the document on which the action should be performed. Various types of action stickers are available, indicating different types of actions. Examples include but are not limited to: printing, e-mailing, faxing, or deleting documents; grouping documents within the collection; modifying the collection; modifying the organization or hierarchy of documents within the collection; playing audio or video files; and specifying access levels to documents or collections.

In one aspect of the invention, the user selects the type of action sticker appropriate for the desired action and places the selected action sticker on a collection coversheet that identifies a collection. The collection coversheet may include document thumbnails (or some other indicator of documents within the collection). The user identifies a particular target document for the desired action by placing the sticker at a location that overlaps, is adjacent to, or points to the thumbnail of the document. Thus, the action sticker specifies what action to take, and the location and/or orientation of the sticker specifies the target document.

Action stickers can be self-adhesive. In one aspect, they employ an adhesive similar to that commonly found in removable office notes, and therefore are removable, repositionable, and reusable. Using removable self-adhesive action stickers to communicate instructions to an MFP has several advantages. In particular, they are inexpensive, convenient, compact, easy to produce, familiar to users, and they do not permanently mar the coversheet.

According to other aspects of the invention, multiple stickers may be placed on a coversheet at the same time. For example, "group" action stickers can be placed on the coversheet on, closest to, or pointing to several documents in the collection. The MFP interprets the group action stickers as an instruction to combine the indicated documents into a sub-collection within the original collection. If stickers are of different kinds, a priority of processes determines the order in which processes are completed. For example, if both a print action sticker and a delete action sticker are present for the same document, the MFP applies processing logic to perform the print action before the delete action.

Alternatively, MFP can detect handwritten notations on a coversheet, specifying desired actions and pointing to document thumbnails. However, it has been found that action stickers are easier to detect and read than are handwritten notations, since action stickers can be designed to have distinctive color, shape, and/or markings. Furthermore, it is generally quicker and more convenient to apply an action sticker than to write a notation. Action stickers can easily be removed so that the coversheet is not damaged or defaced; handwritten notations may be less easy to remove.

Further features of the invention, its nature and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

Figure 1:
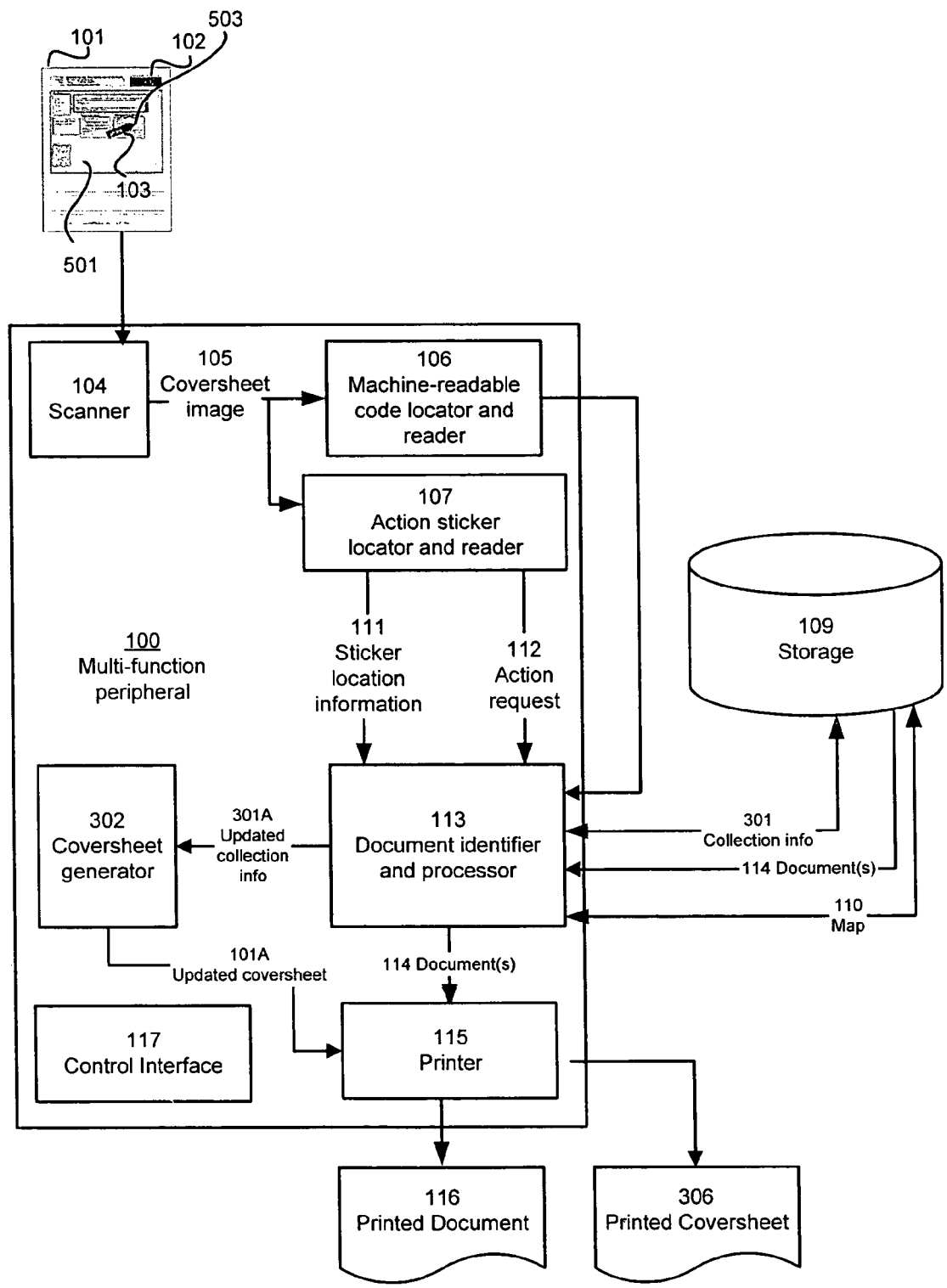
FIG. 1 is a block diagram depicting a functional architecture of a system for reading action stickers and performing actions on stored documents responsive to the action stickers, according to one embodiment of the present invention.

The present invention is now described more fully with reference to the accompanying Figures, in which several embodiments of the invention are shown. The present invention may be embodied in many different forms and should not be construed as limited to the embodiments set forth herein. Rather these embodiments are provided so that this disclosure will be complete and will fully convey the invention to those skilled in the art.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

In this application, the following terms are used:

"Document" refers to any collection of information capable of being stored electronically, including but not limited to text, word processing and spreadsheet files, e-mail messages, voice and audio recordings, images, and video recordings.

"Identifier sheet" refers to a piece of paper or other readable media item that identifies a stored document or collection of documents. As described in above-referenced related patent applications, the identifier sheet may be a collection coversheet or may take on any other form. In one embodiment, the identifier sheet includes a document identifier and/or collection identifier that may be computer-readable, human-readable, or any combination thereof. Identifier sheets are also referred to herein as "document indexes."

One type of identifier sheet is a "collection coversheet." A collection coversheet identifies a collection and also includes representations of documents within the collection. In one embodiment, a collection coversheet includes:

A collection identifier in machine-readable form (such as a barcode) and/or human-readable form (such as a Uniform Resource Locator (URL) or other text string). The collection identifier provides information describing a location of the collection, such as a directory or folder containing documents in the collection.

A collection overview, which represents documents in the collection by thumbnails. Thumbnails are associated with positions in the overview. For instance, the thumbnail for document A might be in the upper left corner of the collection overview, and the thumbnail for document B might be in the lower right corner.

Further description of collection coversheets, collection identifiers, and collection overviews can be found in related patent applications referenced above and incorporated herein by reference.

For illustrative purposes, the following description sets forth the invention in terms of action stickers on collection coversheets. However, one skilled in the art will recognize that the invention can also be implemented using action stickers on other types of identifier sheets, document indexes, or media items that identify stored documents, and that such implementations would not depart from the essential characteristics of the present invention.

Figure 3A:
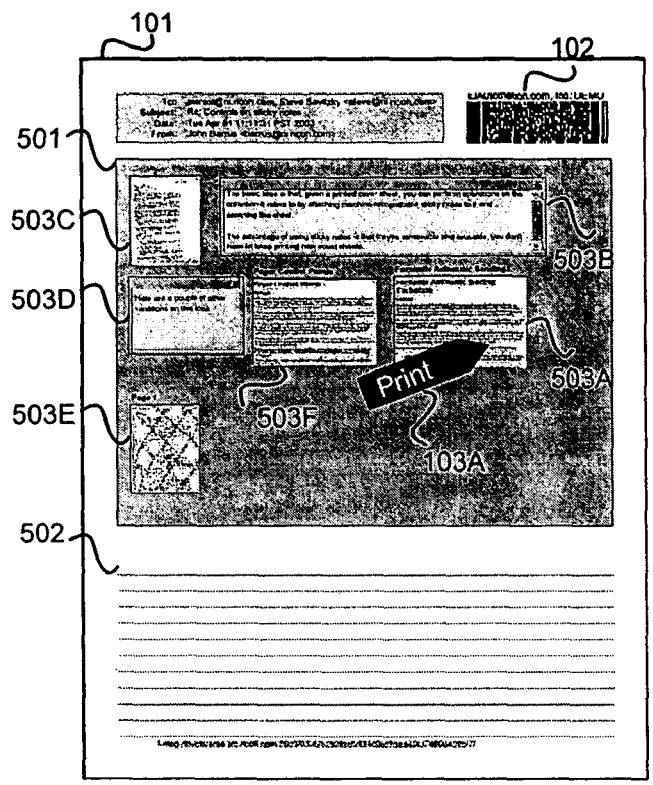
FIG. 3A is an example depicting an action sticker affixed to a coversheet of a collection, according to one embodiment of the present invention.

Referring now to FIG. 3A, there is shown an example of an action sticker 103A affixed to a collection coversheet 101, according to one embodiment of the present invention. In one embodiment, collection coversheet 101 is a piece of paper that includes machine-readable collection identifier 102 and collection overview area 501 containing thumbnail representations 503A-F of digital documents (though other representation of documents can be used in lieu of thumbnails 503A-F, such as for example a simple text list of documents). Also included is annotation area 502, where notes may be written, as described in related cross-referenced applications. The particular layout and components shown in FIG. 3A are merely exemplary.

In the example of FIG. 3A, a print action sticker 103A has been affixed to coversheet 101. It overlaps and points toward thumbnail representation 503A, which refers to one of the documents in the collection associated with coversheet 101. In general, action stickers 103 may be placed in any orientation in overview area 501. The system of the present invention is capable of recognizing action stickers 103 regardless of their orientations.

In one embodiment, action stickers 103 are removable, reusable, and recyclable. They may employ a weak adhesive similar to that found in commonly used removable office notes such as Post-It® Notes available from 3M Company of St. Paul, Minn. One benefit of removable action stickers is that collection coversheet 101 is not permanently marred or ruined by the application of action stickers 103; thus, the user need not reprint new copies of coversheet 101 to execute each document processing request. Reusable action stickers 103 reduce the amount of waste generated by the invention, and reduce the cost to the consumer of implementing the invention. Making action stickers out of recyclable material allows for a coversheet with stickers to be recycled according to conventional recycling methods, without having to separate the stickers from the coversheet 101. One skilled in the art will recognize, however, that the invention can be implemented using action stickers 103 having other forms and characteristics; for example, non-removable and/or non-recyclable action stickers 103 may be used without departing from the essential characteristics of the invention.

Action sticker 103A as shown in FIG. 3A is arrow-shaped and includes a word indicating the desired action ("Print"). Other formats and shapes are possible and will be recognized by one skilled in the art in light of this description. For example, an action sticker 103 may specify an action based on its shape and/or color, or on its orientation or position as placed on coversheet 101, or on a symbol, icon, letter, word, or machine-readable code printed on sticker 103. In one embodiment, the action sticker 103 is machine-readable, so that the shape, color, word, icon, symbol, letter, word, or code is understandable by a machine.

One particular example is an action sticker 103 in the shape of a small "L" that can be used to identify a group of one or more documents on which an action is to be performed. Two stickers 103 can be affixed to delimit the group of documents, by placing a first sticker 103 at the top left corner of the thumbnail of the first document to be processed and a second sticker 103 at the bottom right corner of the thumbnail of the last document in the group. In one embodiment, such an arrangement would signal to the MFP of the present invention that the requested action should be performed those documents that correspond to thumbnails located between the action stickers 103. Other formats for action stickers 103, such as dots, brackets, and rectangles may also be used without departing from the principles of the invention.

In one embodiment, action stickers 103 are of relatively small size as compared to overview area 501, so as to facilitate more accurate interpretations of which document is the intended target based on the placement of the action sticker 103. If an action sticker 103 is placed such that it overlaps more than one thumbnail 503, for example, there is potential ambiguity as to which document should be processed. As will be described in more detail below, the MFP of the present invention can employ any of a number of techniques to resolve such ambiguity. At any rate, an action sticker 103 of relatively small size is less likely to overlap two or more thumbnails.

Figure 3B:
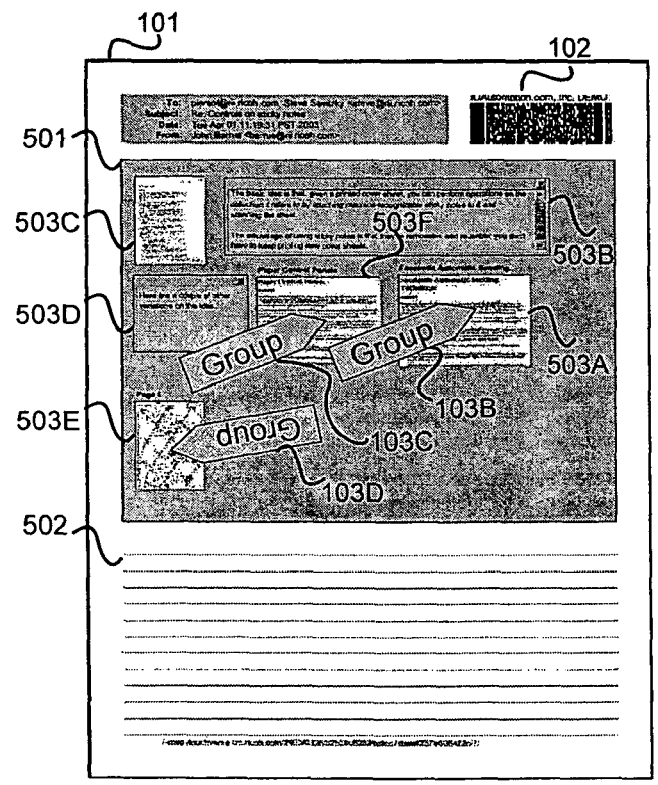
FIG. 3B is an example depicting several action stickers applied to a coversheet of a collection, according to one embodiment of the present invention.

Referring now to FIG. 3B, there is shown an example wherein multiple action stickers 103B-D have been affixed to collection coversheet 101, according to one embodiment of the present invention. "Group" action stickers 103B-D are shown by way of example. Group action stickers 103B-D identify particular documents (in this case, those documents corresponding to thumbnails 503A, 503F, and 503E), that the user wishes to group together as a sub-collection within the original collection represented by coversheet 101. MFP interprets stickers 103B-D and performs the grouping operation as requested. In one embodiment, grouping and sub-collection organization is implemented as described in related cross-referenced patent applications that have been incorporated herein by reference.

Figure 2:
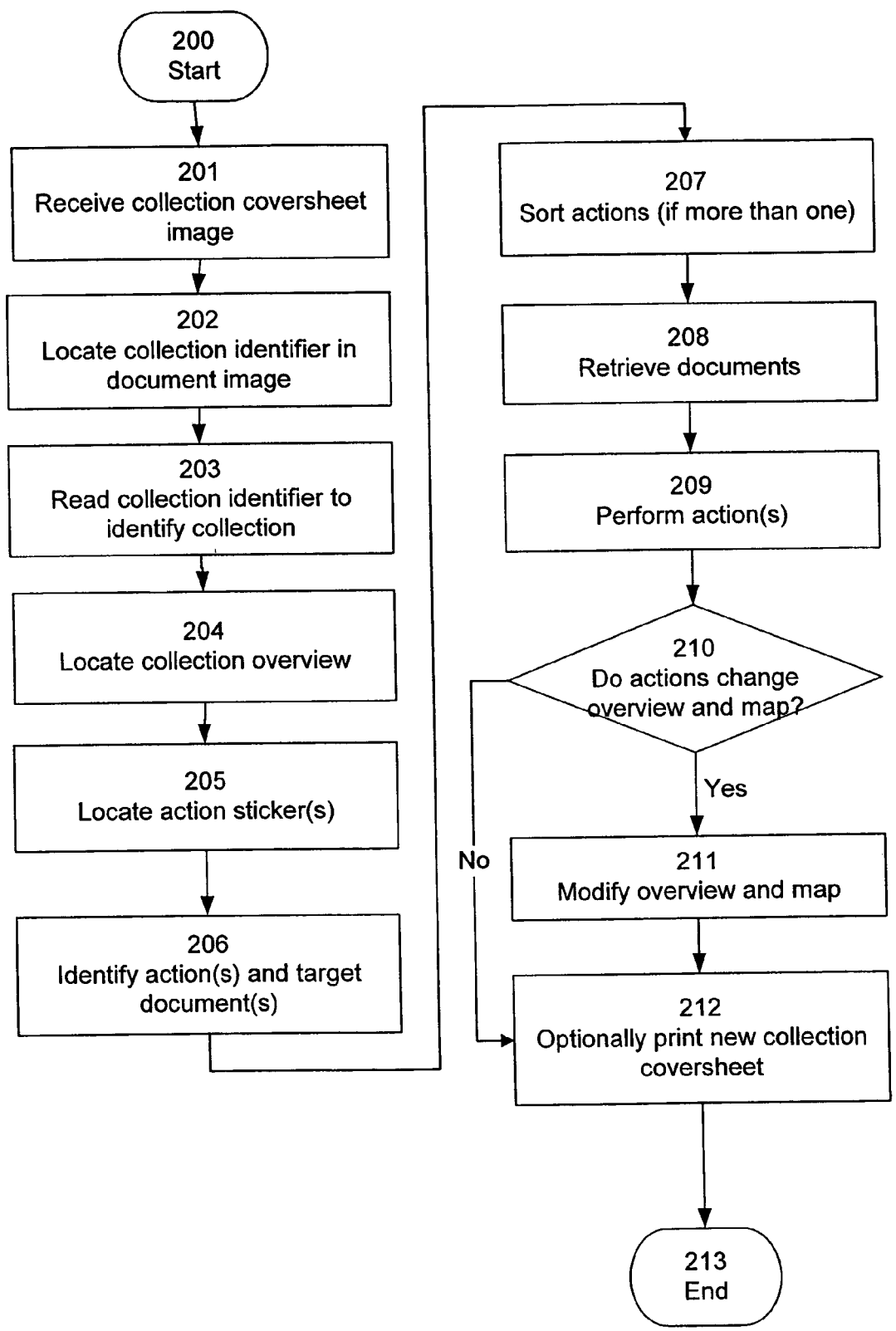
FIG. 2 is a flow diagram depicting a method of reading action stickers and performing actions on stored documents responsive to the action stickers, according to one embodiment of the present invention.

Referring now to FIG. 1, there is shown a block diagram depicting a functional architecture of a system for reading action stickers and performing actions on stored documents responsive to the action stickers, according to one embodiment of the present invention. Referring also to FIG. 2, there is shown a flow diagram depicting a method of reading action stickers and performing actions on stored documents responsive to the action stickers, according to one embodiment of the present invention. The method may be performed, for example, by the system depicted in FIG. 1, or by other functional components and systems. The order of the steps in the described embodiment is merely exemplary. One skilled in the art will recognize that the steps can be performed in an order other than what is depicted.

The invention is described herein in the context of a multifunction peripheral (MFP) 100 including scanner 104, a machine-readable code locator and reader 106, an action sticker locator and reader 107, a document identifier and processor 113, and printer 115. Action sticker locator and reader 107 may also include functionality for locating collection overview area 501 within collection coversheet 101; alternatively, such functionality may be provided in a separate component (not shown). MFP 100 may also contain other components, some of which may not be required for the operation of this invention. MFP 100 may contain a network interface card (not shown), which can receive processing requests from the external network, a fax interface, media capture devices, a media capture port, and the like. Control interface 117 provides a mechanism by which the user can initiate, configure, monitor, and/or terminate MFP 100 operations, for example, to make copies, scan documents, and print faxes. In one embodiment, interface 117 includes a keypad, display, touchscreen, or any combination thereof.

The components shown in MFP 100 are functional components that may be implemented using any combination of hardware elements, software, or the like. For example, the functionality of reader 106 and reader 107 may be implemented within a single hardware component and/or software module, or they may be broken out into separate functional components. Accordingly, the architecture shown in FIG. 1 is intended to illustrate the overall functionality of the invention according to one embodiment, and is not intended to limit the scope of the claimed invention to any particular set of components.

In one embodiment, MFP 100 can access other forms of media through electronic data input peripherals (not shown) including, for example, magnetic media readers for magnetic media such as floppy disks, magnetic tape, fixed hard disks, removable hard disks, memory cards, and the like. Peripherals may also include optical media readers (not shown) for optical storage media such as CDs, DVDs, magneto-optical disks, and the like. In addition, in one embodiment MFP 100 is communicatively coupled to storage device 109, which may be a hard drive or other device capable of storing collections of digital documents, for example in database form. Storage device 109 may be at the same location as MFP 100, or it may be remotely located, connected for example via a network.

As described above in connection with FIGS. 3A and 3B, collection coversheet 101 includes machine-readable collection identifier 102 and collection overview area 501 containing thumbnail representations 503 of digital documents. Action sticker 103 is affixed to coversheet 101 in such a way that it points to thumbnail 503, thus identifying a particular document as the target for the specified action.

MFP 100 receives 201 an image 105 of coversheet 101, for example by scanning coversheet 101 using scanner 104 according to techniques that are well known in the art. Alternatively, MFP 100 may use other input mechanisms known to persons of ordinary skill in the art to receive 201 the image of coversheet 101. For example, MFP 100 may receive the image via e-mail, fax, retrieval from previously stored coversheet 101 images, or the like.

MFP 100 then locates 202 collection identifier 102 within image 105 of coversheet 101, and reads 203 the identifier 102. In one embodiment, steps 202 and 203 are performed by passing image 105 to machine-readable code locator and reader 106, which locates and reads collection identifier 102. Collection identifier 102 identifies the storage location of documents in the collection. In one embodiment, identifier 102 is a URL or the like that identifies documents by location and filename. For example, identifier 102 may identify documents within storage device 109. In one embodiment, identifier 102 also identifies a map that associates documents with particular regions within collection overview 501.

Code locator and reader 106 passes the read collection identifier 102 to document identifier and processor 113 as described in more detail below.

MFP 100 locates 204 collection overview 501 within image 105 of coversheet 101, for example by determining the overall size and shape of overview 501. In one embodiment, overview 501 is provided at a standard location within coversheet 101, or is color coded or otherwise marked, so as to facilitate easier identification of overview 501. Alternatively, overview 501 can be at an arbitrary location and have arbitrary characteristics. In one embodiment, action sticker locator and reader 107 component of MFP 100 performs step 204; in another embodiment, another component (not shown) of MFP 100 performs this step.

MFP 100 locates 205 action sticker(s) 103 that have been affixed to collection overview 105. In one embodiment, action sticker locator and reader 107 component of MFP 100 performs step 205. Step 205 may be performed in response to the user specifying, via control interface 117, that one or more action sticker(s) 103 are present. Alternatively, reader 107 may be configured to automatically attempt to locate action sticker(s) 103 whenever a coversheet 101 has been scanned by scanner 104.

In some embodiments action stickers are recognizable in some way to action sticker locator and reader 107, such as by being a unique color, containing a barcode, having a specific and recognizable shape, or by some other visual characteristic. Alternative methods for locating objects in an image are known the art or have been described in related co-pending applications.

Based on visual characteristic of action sticker(s) 103, action sticker locator and reader 107 identifies 206 the desired action(s). In one embodiment, stickers 103 corresponding to a particular action are visually similar in some respect, for example having the same color or having the same word printed on them. Conversely, stickers 103 corresponding to different actions may be visually dissimilar in some respect, for example by being different colors or having a different word printed on them. In one embodiment, action sticker locator and reader 107 passes the action request 112 to document identifier and processor 113.

MFP 101 also determines, based on the location of action sticker(s) 103, the desired target document(s) for each action. In one embodiment, this determination is made by a) determining an action point for each action sticker 103, and b) determining which thumbnail 503 is located at, or closest to, the action point. In one embodiment, action sticker locator and reader 107 determines action points for each sticker 103, and document identifier and processor 113 determines a target document by comparing the location of action points with known information about thumbnail 503 locations in overview 501.

The action point for a sticker 103 can be the tip of an arrow, or the center of a target, or some other location on the sticker 103 that indicates a target document. In one embodiment, action sticker locator and reader 107 passes sticker location information 111 to document identifier and processor 113; this sticker location information 111 can include action point coordinates. If action sticker locator and reader 107 determines that the action point for a sticker is outside collection overview area 501, in one embodiment it ignores the sticker 103 and does not pass the information 111 to document identifier and processor 113. In another embodiment, it still passes the information 111, so that document identifier and processor 113 can attempt a best estimate as to the target document.

In one embodiment, storage device 109 includes a map 110 corresponding to each collection; the map provides coordinates for thumbnails 503 within overview 501. Thus, two-dimensional coordinates within overview 501 identify (or map to) documents, based on the locations of thumbnails 503 for those documents. In one embodiment, the map is implemented as a list of rectangles, one representing the entire collection overview 501, and other rectangles representing positions of document thumbnails 503 within the overview 501. Map 110 may be stored as a separate file, such as a Scalable Vector Graphics (SVG) file containing a description of collection overview 501 with identifiers that associate regions within the overview 501 with documents in the collection. Alternatively, map 110 may be stored as part of collection information 301.

Document identifier and processor 113 uses collection identifier 102 (obtained from code locator and reader 106) to retrieve, from storage 109, map 110 indicating the correspondence of coordinates within collection overview 501 to collection documents. Based on the map and based on sticker location information 111, document identifier and processor 113 determines a target document. If an action point falls within a rectangle representing a document thumbnail 503, the corresponding document is deemed to be the target of the action. If the action point falls within the rectangles of more than one thumbnail 503 (in an implementation where document thumbnails 503 can overlap), the action can be performed on both documents, or just the topmost document or the first document. Alternatively, in such a situation where ambiguity exists as to which document is the target document, MFP 101 can do any of the following: designate as the target the document corresponding to the closest thumbnail 503 to the action point; determine which document is most likely the intended target based on the type of action being performed and the type of document; determine which document is most likely the intended target based on historical usage; display an error message; and/or prompt the user, via control interface 117, to specify which document is intended to be the target. Similarly, if an action point falls between rectangles of thumbnails 503, document identifier and processor 113 can determine the intended target based on: a) which thumbnail 503 is closest to the action point; b) which thumbnail 503 is pointed to by the action sticker 113; c) which document is best suited for the particular action; d) historical usage; or e) additional information form the user, provided in response to a prompt via control interface 117.

If sticker 103 is arrow-shaped, document identifier and processor 113 is configured to recognize that the likely intended target document is the one that is pointed to by the arrow. Thus, in situations where the action point of sticker 103 falls between rectangles, document identifier and processor 113 (or action sticker locator and reader 107) determines which way the arrow is pointing, so as to more accurately determine the target document.

In one embodiment, coordinates for the action point and overall coordinates for the collection overview 501 are normalized. Thus, coordinates of the action point are converted from a location on coversheet 101 to a location within the overview 501.

In one embodiment, steps 205 and 206 are performed using known techniques of optical feature recognition.

If more than one action sticker 103 is found, document identifier and processor 113 sorts 207 the actions in an appropriate order. For example, if stickers 103 for a particular target document indicate that the document should be both printed and deleted, the print action should take place before the delete action. In one embodiment, the default sort order is as follows: print, e-mail, fax, group, ungroup, delete. Alternatively, MFP 100 may alert the user to the presence of multiple actions on a document and request clarification (via control interface 117, for example) as to the intended order to carry out the actions.

If a specified action involves transmitting the document, for example by e-mail or fax, MFP 100 locates the correct routing information (such as an e-mail address or a fax number) indicating the desired destination for the document. Routing information can be included on or written on sticker 103, or written in annotation area 502 of coversheet 101, so that it can be extracted via optical character recognition (OCR). For example, if a single e-mail address is written in annotation area 502, all documents to be e-mailed can be sent to that e-mail address. Alternatively, MFP 100 can prompt the user to enter routing information via control interface 117. Alternatively, the routing information could be written on a second sheet of paper to be scanned or in a second image received by MFP 100. In any of these embodiments, the operation of determining routing information can be performed by action sticker locator and reader 107, or by document identifier and processor 113, or by another component of MFP 100.

Once actions and target document(s) have been determined, document identifier and processor 113 uses collection identifier 102 (obtained from code locator and reader 106) to retrieve 208, from storage 109, the target document(s) 114 and performs 209 the specified action(s) in the determined order. For some actions (such as delete), retrieval of the document(s) 114 is not required, and step 208 is not performed. In one embodiment, document identifier and processor 113 first retrieves collection information 301 which includes or points to target document(s) 114, and then obtains target document(s) 114 accordingly.

Examples of stickers 103 and their corresponding actions include:

Print sticker: Document identifier and processor 113 sends target document(s) 114 to printer 115. Printer 115 outputs printed document 116.

E-mail or fax sticker: Document identifier and processor 113 sends the documents to an e-mail or fax module (not shown) of MFP 100 to be transmitted accordingly.

Group sticker: Document identifier and processor 113 creates a new sub-collection including the target documents, deletes the target documents from the original collection, and adds the new sub-collection to the original collection. In one embodiment, all of the documents pointed to by "group" stickers 103 are placed into the same new sub-collection; alternatively, different types of group stickers 103 (color-coded or otherwise distinguishable from one another) can be used, so that a new sub-collection is created for each type of group sticker 103.

Ungroup sticker (on an existing sub-collection): Documents within the sub-collection are retrieved and placed in the overall collection corresponding to coversheet 101.

Delete sticker: Document identifier and processor 113 deletes the specified document(s) or sub-collection(s). In one embodiment, a confirmation dialog box is presented on control interface 117 before the delete operation is performed.

Play sticker: Document identifier and processor 113 sends target document(s) 114 (such as audio and/or video files) to an output device to be played.

Document identifier and processor 113 determines 210 whether any of the performed actions cause changes to collection map 110 and overview 501. If so, document identifier and processor 113 modifies 211 collection map 110 and overview 501 accordingly to indicate locations of thumbnails 503 corresponding to new documents and sub-collections and to delete thumbnails 503 for documents and sub-collections that have been removed. The updated collection info 301, map 110, and/or overview 501 are stored in storage device 109. Optionally, the updated collection information 301 and map 110 are sent to coversheet generator 302 for generation of an updated coversheet 101A including a new overview 501, as described below.

When documents are moved from one collection to another, a default layout can be used for the arrangement of thumbnails 503. Alternatively, the user may be given an opportunity to indicate a layout. Such techniques are described in related cross-referenced patent applications.

Printer 115 may optionally (or automatically) print 212 a new collection coversheet 306 representing the collection, particularly if collection organization has been modified, or if nonremovable stickers 103 have been used.

For example, a print action sticker 103 can be used to request printing of a document in the collection by placing print action sticker 103 on coversheet 101. Machine-readable code locator and reader 106 reads the collection identifier 102. Action sticker locator and reader 107 locates and reads the print action sticker 103, passing sticker location information 111 and a print action request 112 to document identifier and processor 113. Document identifier and processor 113 identifies the target document based on the sticker location information 111 and on map 110 retrieved from storage 109. Document identifier and processor 113 retrieves document 114 from storage and passes it to printer 115. Printer 115 outputs printed document 116.

In one embodiment, when collection organization is modified (such as by changing hierarchy, layout, or access levels), a new version or layer of the collection is added. Thus, rather than overwriting the collection with new information, an updated version of the collection is generated and stored in a new location within storage 109, and a new collection identifier 102 is generated that points to the new location. A new coversheet 101A is printed with the new collection identifier 102. In this manner, previous versions of collections are preserved.

For example, when a document is deleted, a new collection is created which is exactly like the original collection except that it omits the deleted document. Map 110 and overview 501 are altered to reflect that the document has been deleted. The new collection can be either a new layer of the original collection or it can be a completely new collection unrelated to the original except that it was derived from the original. Such versioning and layering techniques are described in detail in related cross-referenced applications.

In one embodiment, MFP 100 includes coversheet generator 302, either as a separate functional module or as a component of document identifier and processor 113 or some other component. Coversheet generator 302 is therefore an optional component that need not be included, and indeed is absent in some embodiments. When included, coversheet generator 302 performs step 211 to receive updated collection info 301A from document identifier and processor 113, modify collection map 110, and generate an updated coversheet 101A to be sent to printer 115 to be output as printed coversheet 306.

In some embodiments, the present invention includes the following additional features and functionality. Any of these features may be included alone or in combination with one another and/or in combination with the above-described features and components.

Permission Level Action Stickers. In one embodiment, action stickers 103 are used to specify or modify access permission levels to documents and/or to create a collection with limited access permissions for documents in the collection. Upon detecting such an action sticker 103, MFP 100 modifies access permission levels according to techniques that are described in related cross-referenced patent applications.

Action Stickers as Physical Access Keys. In one embodiment, action stickers 103 contain machine-readable codes containing keys to decrypt encrypted documents stored in collections. Thus, the action sticker 103 functions as a physical access key as described in related cross-referenced application No. titled "Physical Key for Accessing a Securely Stored Digital Document," filed Aug. 11, 2003 and incorporated herein by reference. By its placement on coversheet 101, the action sticker 103 identifies which document or collection should be decrypted using the decryption key imprinted on the action sticker 103.

Generic Action Stickers. According to another embodiment, generic action stickers can be applied to collection coversheets 101. Generic action stickers are identifiable by some visual characteristic as being an action sticker 103, but one without a particular action. For example, one format for generic action stickers is to be the same size and shape as other action stickers 103, but without any words printed on them. By its placement on coversheet 101, a generic action sticker identifies one or more target document(s) but does not identify an action to be performed. The user is prompted, for example via control interface 117, to specify a desired action to be performed on the target document(s).

What is claimed is:

1. A computer-implemented method for processing stored documents, comprising:
   receiving an electronic image of a document index, the document index being on a printed medium and comprising a plurality of graphic representations of stored documents and a plurality of removable self-adhesive stickers, each graphic representation uniquely identifies each corresponding stored document;
   locating, within the plurality of graphic representations of the stored documents on the document index image, at least a first graphic representation of a first stored document;
   locating, on the document index image with respect to the location of the first graphic representation of the first stored document, an image of a first sticker specifying a first action;
   determining that the first sticker specifies that the first action be performed on the first stored document based on the location of the first sticker with respect to the location of the first graphic representation of the first stored document and
   performing the first action to cause a change to the first stored document as specified by the first sticker.

2. The method of claim 1, wherein the first stored document is part of a stored collection of documents, and wherein the document index image comprises a collection coversheet image.

3. The method of claim 2, wherein the collection coversheet image comprises a collection overview image.

4. The method of claim 3, wherein the collection overview image comprises a plurality of thumbnail depictions of documents.

5. The method of claim 2, wherein the collection coversheet image comprises a machine-readable collection identifier specifying a storage location for the collection of documents, the method further comprising, prior to performing the first action:
   retrieving the identified first stored document from the specified storage location.

6. The method of claim 2, further comprising modifying the stored collection of documents.

7. The method of claim 6, further comprising generating an updated collection coversheet image.

8. The method of claim 2, further comprising storing a new version of the collection of documents.

9. The method of claim 8, further comprising generating an updated collection coversheet image including a collection identifier specifying a location for the new version.

10. The method of claim 1, wherein determining that the first sticker specifies the first action to be performed on the first stored document based on a location of the first sticker with respect to the location of the first graphic representation of the first stored document comprises determining whether the first graphic representation of the first stored document is overlapped by the first action sticker.

11. The method of claim 1, wherein determining that the first sticker specifies the first action to be performed on the first stored document based on the location of the first sticker with respect to the location of the first graphic representation comprises determining a proximity of the first action sticker to a second graphic representation of a second stored document.

12. The method of claim 1, wherein determining that the first sticker specifies the first action to be performed on the first stored document based on the location of the first sticker with respect to the location of the first graphic representation comprises determining the first graphic representation of the first stored document is pointed to by the first sticker.

13. The method of claim 1, wherein:
   the first sticker comprises an action point; and
   determining that the first sticker specifies the first action be performed on the first stored document based on the location of the first sticker with respect to the location of the first graphic representation comprises determining a proximity of the action point of the first sticker to one of the document representations.

14. The method of claim 1, wherein:
   the first sticker comprises an action point; and
   determining that the first sticker specifies the first action to be performed on the first stored document based on the location of the first sticker with
   respect to the location of the first graphic representation comprises:
   determining a coordinate location for the action point;
   determining a coordinate location for the first graphic representation of the first stored document; and
   comparing the coordinate location for the action point with the coordinate location for the first graphic representation of the first stored document.

15. The method of claim 1, wherein the document index image comprises a list of stored documents.

16. The method of claim 1, wherein each graphic representation comprises a thumbnail depiction of one of the plurality of graphic representations of documents.

17. The method of claim 1, wherein each of the plurality of graphic representations comprises an icon representing a stored document.

18. The method of claim 1, wherein the first action comprises one selected from the group consisting of:
   printing;
   e-mailing;
   faxing;
   grouping;
   reordering;
   playing;
   ungrouping; and
   deleting.

19. The method of claim 1, wherein the first action comprises specifying an access level for the first stored document.

20. The method of claim 1, further comprising:
   locating, on the document index image, at least a second graphic representation of a second stored document;
   locating, on the document index image, an image of a second sticker specifying a second action;

determining that the second sticker specifies the second action be performed on the second stored document based on a second location of the second sticker with respect to the second graphic representation; and performing the second action to cause a change to the identified second stored document.

21. The method of claim 20, further comprising:

prior to performing the first action, retrieving the first stored document from a storage device; and prior to performing the second action, retrieving the second stored document from a storage device.

22. The method of claim 1, wherein the first sticker specifies a grouping action, the method further comprising:

locating, on the document index image, at least a second graphic representation of a second stored document;

locating, on the document index image, an image of a second sticker specifying a grouping action; and determining that the second sticker specifies the grouping action be performed on the second stored document based on a location of the second sticker with respect to the second graphic representation;

and wherein performing the first action comprises grouping the first stored document and the second stored document.

23. The method of claim 22, wherein grouping the first stored document and the second stored document comprises forming a sub-collection of documents comprising the first stored document and the second stored document.

24. The method of claim 1, further comprising:

locating, on the document index image, an image of a second sticker specifying a second action;

determining that the second sticker specifies the second action be performed on the first stored document based on a location of the second sticker with respect to the first graphic representation;

determining an order for performing the first action and the second action; and performing the second action on the first stored document; wherein the first and second actions are performed according to the determined order.

25. The method of claim 24, wherein determining an order comprises sorting according to a predetermined sequence of actions.

26. The method of claim 1, wherein the first action comprises transmitting the first stored document to a destination, the method further comprising:

determining the destination.

27. The method of claim 26, wherein determining the destination comprises receiving user input specifying a destination.

28. The method of claim 26, wherein determining the destination comprises reading an indicator of the destination from the image of the document index.

29. The method of claim 26, wherein determining the destination comprises reading an indicator of the destination from the first sticker.

30. The method of claim 26, wherein determining the destination comprises determining at least one selected from the group consisting of:

an e-mail address;
a fax number;
a uniform resource locator;
a telephone number; and
a mailing address.

31. The method of claim 1, wherein receiving the image of the document index comprises scanning a piece of paper comprising the document index image.

32. The method of claim 1, wherein receiving the image of the document index comprises receiving an e-mail message comprising the document index image.

33. The method of claim 1, wherein receiving the image of the document index comprises receiving a fax message comprising the document index image.

34. The method of claim 1, further comprising determining the first action by reading the first sticker.

35. The method of claim 1, further comprising determining the first action by performing optical character recognition on the first sticker.

36. The method of claim 1, further comprising determining the first action by determining a shape of the first sticker.

37. The method of claim 1, further comprising determining the first action by determining a color of the first sticker.

38. The method of claim 1, further comprising determining the first action by reading a machine-readable icon on the first sticker.

39. The method of claim 1, wherein the document index image comprises an identifier specifying a storage location, the method further comprising, prior to performing the first action:

retrieving the first stored document from the storage location.

40. The method of claim 1, further comprising, prior to performing the first action, retrieving the first stored document from a storage device.

41. A computer-implemented method for processing stored documents, comprising:

receiving an electronic image of a document index, the document index being on a printed medium and comprising a plurality of graphic representations of stored documents and a plurality of removable self-adhesive stickers, each graphic representation uniquely identifies each corresponding stored document;

locating, within the plurality of graphic representations of the stored documents on the document index image, at least a first graphic representation of a first stored document;

locating, on the document index image with respect to the location of the first graphic representation of the first stored document, an image of a first sticker;

determining that the first sticker specifies receiving input in association with the first stored document based on the location of the first sticker with respect to the first graphic representation of the first stored document;

receiving input specifying an action; and performing the specified action to cause a change to the first stored document.

42. The method of claim 41, wherein receiving input specifying an action comprises receiving input via a user interface.

43. A computer program product for processing a first stored document, comprising: a computer-readable storage medium; and computer program code, encoded on the medium, for: receiving an electronic image of a document index, the document index being on a printed medium and comprising a plurality of graphic representations of stored documents and a plurality of removable self-adhesive stickers, each graphic representation uniquely identifies each corresponding stored document; locating, within the plurality of graphic representations of the stored documents on the document index image, at least a first graphic representation of a first stored document;

locating, on the document index image with respect to the location of the first graphic representation of the first stored document, an image of a first sticker specifying a first action;

determining that the first sticker specifies that the first action be performed on the first stored document based on the location of the first sticker with respect to the location of the first graphic representation of the first stored document and performing the first action to cause a change to the first stored document as specified by the first sticker.

44. The computer program product of claim 43, wherein the first stored document is part of a stored collection of documents, and wherein the document index image comprises a collection coversheet image.

45. The computer program product of claim 44, wherein the collection coversheet image comprises a collection overview.

46. The computer program product of claim 45, wherein the collection overview image comprises a plurality of thumbnail depictions of documents.

47. The computer program product of claim 44, wherein the collection coversheet image comprises a machine-readable collection identifier specifying a storage location for the collection of documents, the computer program product further comprising computer program code, encoded on the medium, for, prior to performing the first action:

retrieving the first stored document from the storage location.

48. The computer program product of claim 44, further comprising computer program code, encoded on the computer-readable storage medium, for modifying the stored collection of documents.

49. The computer program product of claim 48, further comprising computer program code, encoded on the computer-readable storage medium, for generating an updated collection coversheet image.

50. The computer program product of claim 44, further comprising computer program code, encoded on the computer-readable storage medium, for storing a new version of the collection of documents.

51. The computer program product of claim 50, further comprising computer program code, encoded on the computer-readable storage medium, for generating an updated collection coversheet image including a collection identifier specifying a location for the new version.

52. The computer program product of claim 43, wherein the first action comprises one selected from the group consisting of:
   printing;
   e-mailing;
   faxing;
   grouping;
   reordering;
   playing;
   ungrouping; and
   deleting.

53. The computer program product of claim 43, wherein the first action comprises specifying an access level for the first stored document.

54. The computer program product of claim 43, wherein the first sticker specifies a grouping action, the computer program product further comprising computer program code, encoded on the computer-readable storage medium, for:
   locating, on the document index image, at least a second graphic representation of a second stored document;
   locating, on the document index image, an image of a second sticker specifying a grouping action; and
   determining that the second sticker specifies the grouping action be performed on the second stored document based on a location of the second sticker with respect to the second graphic representation;

and wherein the computer program code for performing the first action comprises computer program code for grouping the first stored document and the second stored document.

55. The computer program product of claim 54, wherein the computer program code for grouping the first document and the second document comprises computer program code for forming a sub-collection comprising the first stored document and the second-stored document.

56. The computer program product of claim 43, further comprising computer program code, encoded on the medium, for:
   locating, on the document index image, an image of a second sticker specifying a second action;
   determining that the second sticker specifies an second action to be performed on the first stored document based on a location of the second sticker with respect to the first graphic representation;
   determining an order for performing the first action and the second action; and
   performing the second action on the first stored document;
   wherein the first and second actions are performed according to the determined order.

57. The computer program product of claim 43, wherein the first action comprises transmitting the first stored document to a destination, the computer program product further comprising computer program code, encoded on the computer-readable storage medium, for:
   determining the destination.

58. The computer program product of claim 43, further comprising computer program code, encoded on the computer-readable storage medium, for determining the first action by reading the first sticker.

59. The computer program product of claim 43, wherein the document index comprises an identifier specifying a storage location, the computer program product further comprising, computer program code, encoded on the computer-readable storage medium, for, prior to performing the first action:
   retrieving the first stored document from the storage location.

60. The computer program product of claim 43, further comprising, computer program code, encoded on the computer-readable storage medium, for, prior to performing the first action, retrieving the first stored document from a storage device.

61. A system for processing stored documents comprising:
   a document index input device, for receiving an electronic image of a document index, the document index being on a printed medium and comprising a plurality of graphic representations of stored documents and a plurality of removable self-adhesive stickers, each graphic representation uniquely identifies each corresponding stored document;
   a document locator, for locating, within the plurality of graphic representations of the stored documents on the document index image, at least a first graphic representation of a first stored document; a sticker locator, coupled to the document input index device and the document locator, for locating, on the document index image with respect to the location of the first graphic representation of the first stored document, an image of a first sticker specifying a first action and for determining that the first sticker specifies that the first action be performed on the first stored document based on the location of the first sticker with respect to the location of the first graphic representation of the first stored document; and a document processor, coupled to the document identifier, for performing the first action to cause a change to the first stored document as specified by the first sticker.

62. The system of claim 61, wherein the first document is part of a stored collection of documents, and wherein the document index image comprises a collection coversheet image.

63. The system of claim 62, wherein the collection coversheet image comprises a collection overview image.

64. The system of claim 63, wherein the collection overview image comprises a plurality of thumbnail depictions of stored documents.

65. The system of claim 62, wherein the collection coversheet image comprises a machine-readable collection identifier specifying a storage location for the collection of documents, the system further comprising:

a document retriever, coupled to the document identifier, for retrieving the first stored document from the specified storage location.

66. The system of claim 62, wherein the document processor modifies the stored collection of documents.

67. The system of claim 66, further comprising a coversheet generator, coupled to the document processor, for generating an updated collection coversheet image.

68. The system of claim 62, further comprising a storage device, coupled to the document processor, for storing a new version of the collection of documents.

69. The system of claim 68, further comprising a coversheet generator, coupled to the document processor, for generating an updated collection coversheet image including a collection identifier specifying a location for the new version.

70. The system of claim 61, wherein the first action comprises one selected from the group consisting of:
printing;
e-mailing;
faxing;
grouping;
reordering;
playing;
ungrouping; and
deleting.

71. The system of claim 61, wherein the first action comprises specifying an access level for the first stored document.

72. The system of claim 61, wherein the first sticker specifies a grouping action, wherein:

the document locator locates, on the document index image, at least a second graphic representation of a second stored document;

the sticker locator locates, on the document index image, an image of a second sticker specifying a grouping action and determines that the second sticker specifies a grouping action to be performed on the second stored document based on a location of the action sticker with respect to the second graphic representation; and the document processor groups the first identified stored document and the second identified stored document.

73. The system of claim 72, wherein the document processor groups the first stored document and the second stored document by forming a sub-collection of documents comprising the first stored document and the second stored document.

74. The system of claim 61, wherein:

the sticker locator locates, on the document index image, an image of a second sticker specifying a second action;

the sticker locator determines that the second sticker specifies a grouping action to be performed on the first stored document based on a location of the first sticker with respect to the first graphic representation; and the document processor determines an order for performing the first action and the second action, and performs the second action on the first stored document according to the determined order.

75. The system of claim 61, wherein the document index comprises an identifier specifying a storage location, the system further comprising:

a document retriever, coupled to the document identifier, for retrieving the first stored document from the specified storage location.

76. The system of claim 61, further comprising:

a document retriever, coupled to the document identifier, for retrieving the first stored document from a storage device.

* * * * *